US011526697B1

(12) United States Patent
Tripathi et al.

(10) Patent No.: US 11,526,697 B1
(45) Date of Patent: Dec. 13, 2022

(54) THREE-DIMENSIONAL POSE ESTIMATION (71) Applicant: Amazon Technologies, Inc., Seattle, WA (US)

(72) Inventors: Shashank Tripathi, Sunnyvale, CA (US); Ambrish Tyagi, Sunnyvale, CA (US); Amit Kumar Agrawal, Santa Clara, CA (US); Siddhant Ranade, Cupertino, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 288 days.

(21) Appl. No.: 16/814,526

(22) Filed: Mar. 10, 2020

(51) Int. Cl.
| | |
|---|---|
| *G06V 40/10* | (2022.01) |
| *G06K 9/62* | (2022.01) |
| *G06N 3/04* | (2006.01) |
| *G06N 3/08* | (2006.01) |
| *G06V 20/64* | (2022.01) |
| *G06V 10/82* | (2022.01) |

(52) U.S. Cl.
CPC ......... *G06K 9/6262* (2013.01); *G06N 3/0454* (2013.01); *G06N 3/08* (2013.01); *G06V 20/647* (2022.01); *G06V 40/103* (2022.01); *G06V 10/82* (2022.01)

(58) Field of Classification Search
CPC .......... G06N 3/08; G06N 3/04; G06N 3/0454; G06N 5/02; G06K 9/62; G06K 9/6262; G06V 10/82; G06V 20/52; G06V 40/103; G06V 40/172; G06V 20/647; G06F 3/017; G06T 2207/20081; G06T 2207/30196; G06T 13/40; G06T 17/00; G06T 17/20; G06T 19/00; G06T 2207/20101; G06T 7/55; G06T 7/75
See application file for complete search history.

(56) References Cited

U.S. PATENT DOCUMENTS

| | | | | |
|---|---|---|---|---|
| 10,373,332 | B2 * | 8/2019 | Gu ...................... | G06K 9/6271 |
| 10,499,031 | B2 * | 12/2019 | Ayari ..................... | G06N 20/00 |
| 10,679,046 | B1 * | 6/2020 | Black ................... | G06N 3/0454 |
| 10,853,970 | B1 * | 12/2020 | Akbas .................. | G06T 1/0007 |
| 10,929,654 | B2 * | 2/2021 | Iqbal ................... | G06V 40/107 |

(Continued)

FOREIGN PATENT DOCUMENTS

WO WO-2020254448 A1 * 12/2020

OTHER PUBLICATIONS

D. Drover, R. MV, C.-H. Chen, A. Agrawal, A. Tyagi, and C. P. Huynh. Can 3d pose be learned from 2d projections alone? European Conference on Computer Vision Workshops, 2018. arXiv:1808.07182 (Year: 2018).*

*Primary Examiner* — Ian L Lemieux
(74) *Attorney, Agent, or Firm* — K&L Gates LLP (57) ABSTRACT

Devices and techniques are generally described for estimating three-dimensional pose data. In some examples, a first machine learning network may generate first three-dimensional (3D) data representing input 2D data. In various examples, a first 2D projection of the first 3D data may be generated. A determination may be made that the first 2D projection conforms to a distribution of natural 2D data. A second machine learning network may generate parameters of a 3D model based at least in part on the input 2D data and based at least in part on the first 3D data. In some examples, second 3D data may be generated using the parameters of the 3D model.

18 Claims, 7 Drawing Sheets

(56) References Cited

U.S. PATENT DOCUMENTS

| | | | |
|---|---|---|---|
| 10,997,787 B2* | 5/2021 | Ge | G06V 10/774 |
| 11,182,924 B1* | 11/2021 | Akbas | G06T 7/246 |
| 2019/0188533 A1* | 6/2019 | Katabi | G01S 13/88 |
| 2019/0304134 A1* | 10/2019 | Mauchly | G06N 3/0454 |
| 2020/0058137 A1* | 2/2020 | Pujades | G06V 40/23 |
| 2020/0184721 A1* | 6/2020 | Ge | G06N 3/0454 |
| 2020/0342270 A1* | 10/2020 | Biswas | G06T 7/70 |
| 2021/0232924 A1* | 7/2021 | Sun | G06V 40/11 |
| 2021/0287430 A1* | 9/2021 | Li | G06T 7/74 |
| 2022/0012940 A1* | 1/2022 | Park | G06T 15/205 |

* cited by examiner

THREE-DIMENSIONAL POSE ESTIMATION

BACKGROUND

Accurately estimating three-dimensional ("3D") poses from two-dimensional ("2D") reference points is a classical ill-posed problem in computer vision. Methods for 3D pose prediction are typically classified into model-free and model-based approaches. Typically, model-free approaches directly learn a mapping from 2D reference points to 3D joints. Predicting 3D joints from 2D reference points is often referred to as "lifting." Lifting is a challenging task, since an infinite number of 3D poses exist that correspond to a given 2D skeleton due to positive ambiguity. Model-based approaches often fit 3D parametric models such as the skinned multi-person linear ("SMPL") representation to estimate 3D shape and pose. This is typically done by minimizing the 2D error between the projection of the predicted 3D pose in the 2D space and the given 2D reference points. However, 2D re-projection error alone is highly under-constrained and can be minimized via non-natural joint angles. To address these issues, previous 2D to 3D approaches have used various kinds of additional 3D supervision, including paired 2D-3D correspondences, unpaired 3D data, and synthetic data generated using motion capture ("MoCap") sequences.

DETAILED DESCRIPTION

In the following description, reference is made to the accompanying drawings that illustrate several examples of the present invention. It is understood that other examples may be utilized and various operational changes may be made without departing from the spirit and scope of the present disclosure. The following detailed description is not to be taken in a limiting sense, and the scope of the embodiments of the present invention is defined only by the claims of the issued patent.

In various embodiments described herein, a neural network is trained that takes 2D pose reference points (sometimes referred to as "landmarks") as input and outputs SMPL parameters and 3D skeletons, without requiring any additional 3D data or iterative fitting during training. The 2D pose data input may comprise skeletons including a set of joints (defined points in the two-dimensional plane). In various examples, a set of lines (sometimes referred to as "bones") may be used to connect two or more of the joints. A lifting network (sometimes referred to herein as a "teacher" network) is first trained using only 2D image data inputs to predict model-free 3D poses. The 3D pose output from the teacher network is used as pseudo ground-truth data to train a "student" network to predict SMPL pose parameters. Thus, inspired by the knowledge distillation (KD) framework, the teacher-student network described herein allows training the network in the absence of additional 3D data. As described in further detail below, previous approaches that train the student network by directly minimizing the 2D re-projection error (without using knowledge from the teacher network) fails to generate accurate 3D pose estimations due to inherent ambiguities in 2D projection, resulting in incorrect depth predictions and unnatural poses.

Machine learning approaches have been used for 3D pose estimation of 2D image data. Machine learning techniques are often used to form predictions, solve problems, recognize objects in image data for classification, etc. In various examples, machine learning models may perform better than rule-based systems and may be more adaptable as machine learning models may be improved over time by retraining the models as more and more data becomes available. Accordingly, machine learning techniques are often adaptive to changing conditions. Deep learning algorithms, such as neural networks, are often used to detect patterns in data and/or perform tasks.

Generally, in machine learned models, such as neural networks, parameters control activations in neurons (or nodes) within layers of the machine learned models. The weighted sum of activations of each neuron in a preceding layer may be input to an activation function (e.g., a sigmoid function, a rectified linear units (ReLu) function, etc.). The result determines the activation of a neuron in a subsequent layer. In addition, a bias value can be used to shift the output of the activation function to the left or right on the x-axis and thus may bias a neuron toward activation.

Generally, in machine learning models, such as neural networks, after initialization, annotated training data may be used to generate a cost or "loss" function that describes the difference between expected output of the machine learning model and actual output. The parameters (e.g., weights and/or biases) of the machine learning model may be updated to minimize (or maximize) the cost. For example, the machine learning model may use a gradient descent (or ascent) algorithm to incrementally adjust the weights to cause the most rapid decrease (or increase) to the output of the loss function. The method of updating the parameters of the machine learning model may be referred to as back propagation.

Optimization-based approaches to 3D pose estimation such as those described by Federica Bogo, Angjoo Kanazawa, Christoph Lassner, Peter Gehler, Javier Romero, and Michael J Black. Keep it SMPL: Automatic estimation of 3d human pose and shape from a single image. In European Conference on Computer Vision (ECCV), pages 561-578. Springer, 2016 can also fit SMPL meshes to 2D poses. However, such approaches are computationally expensive, potentially prone to error, and require good initialization as well as 3D pose priors built using motion capture sequences. In contrast, the various teacher-student networks described herein allow training a feed-forward network that can directly output SMPL pose for a given 2D input.

Knowledge distillation in machine learning refers to use of a relatively small model (e.g., in terms of a number of layers, number of neurons, size of the model stored in memory, etc.) to mimic a pre-trained, larger model or ensemble of models. In knowledge distillation, the large model or ensemble of models is typically referred to as the "teacher," while the small model is typically referred to as the "student." In distillation, knowledge is transferred from the teacher model to the student by minimizing a loss function in which the target is the distribution of class probabilities predicted by the teacher model. Typically, knowledge distillation approaches train the teacher network in a supervised manner and the student network is often used to reduce run-time/complexity. In various embodiments described herein, the teacher (lifter) network is trained in an unsupervised manner without using multi-view images, depth images, or 3D supervision. Compared to previous approaches, the techniques described herein may offer improved 3D pose estimation by utilizing dilated convolutions to model temporal dynamics.

When using a parametric model such as SMPL, there often exists a semantic gap between the SMPL 3D joints and the 2D landmarks obtained from RGB images (e.g., using the OpenPose 2D pose estimation technique). For example, the 3D hip joints in SMPL are close to the center of the pelvis, while in the Human3.6M dataset, the 2D hip joints are close to the body surface. In previous works, this semantic adaptation is learned offline by fitting SMPL meshes to specific 3D datasets and the semantic adaptation is used during evaluation. Thus, 3D data is also required implicitly for bridging the aforementioned semantic gap. In contrast, in the various techniques described herein, the semantic adaptation may be automatically learned during training to bridge the gap between the SMPL 3D joints and the 2D landmarks during training. Eliminating the semantic gap is important, as otherwise the network may minimize joint error by twisting the posed body, resulting in unnatural poses.

Previous 2D to 3D approaches can be broadly classified into model-free methods, and model-based methods. Model-free methods predict a 3D skeleton from 2D joints. Model-based approaches use a parametric model, such as SMPL, to estimate human meshes (e.g., 3D mesh representations of the human form). Several model-free and model-based approaches have used 3D supervision during training. The 3D information has been used in various forms such as paired 2D-3D data, 3D pose priors (e.g., a Gaussian Mixture Model) built using 3D motion capture sequences, learned priors using 3D data via discriminator models, and synthetic 2D-3D pairings. In various embodiments described herein, model-based and model-free predictions are generated without requiring any of the aforementioned types of 3D data during training.

In various embodiments described herein, a teacher network uses an unsupervised algorithm for lifting 2D poses to 3D using the intuition that random 2D projections of accurately-estimated 3D poses should conform to the real 2D pose distribution. A 2D discriminator provides feedback to the teacher network regarding the "naturalness" of the 2D projections of the 3D skeleton (e.g., how realistic the 2D projections appear). For example, the 2D discriminator may determine whether the 2D projection of the 3D skeleton conforms to a distribution of natural 2D pose data (e.g., 2D image data captured of natural human, animal, and/or object poses). Accordingly, the 2D discriminator may aid in training the teacher network without requiring direct 3D supervision.

Additionally, in various embodiments described herein, the 3D pose estimation architecture may use one or more frames of 2D image data as input during inference, and may enforce weak temporal consistency using an additional discriminator on frame differences. In various examples, dilated convolutions may be used to model temporal dynamics in the teacher network as well as in the discriminator. In at least some examples, training and/or testing may be performed on multi-frame inputs. Previous video-based approaches have employed 3D trajectory optimization via low rank property and temporal smoothness of video sequences. Instead, in various embodiments described herein, novel loss terms are used to account for the consistency of predicted skeletons on common frames across neighboring time-steps.

Previous deep learning approaches to 3D pose estimation have used SMPL to directly regress to the underlying shape and pose parameters by training a feed-forward network. The 3D joints are computed via linear regression on the estimated mesh vertices. In various embodiments, the student network of the 3D pose estimation architecture may predict SMPL parameters, but may differ from previous approaches in the following respects.

First, it is noted that previous approaches have minimized the 2D re-projection error between the projection of the SMPL 3D joints and the predicted 2D joints from images. However, 2D keypoint loss is highly unconstrained and thus learns the limits of joint angles using a dataset of 3D scans. This is done by training a discriminator to bring the distribution of predicted SMPL parameters close to the real distribution of SMPL parameters obtained from 3D scans. However, the various embodiments described herein do not assume access to any additional 3D data at training time. Accordingly, in various embodiments described herein, a teacher network is first trained to predict 3D joint positions from input image data. The output of the teacher network is used as pseudo ground-truth to train the student network to predict SMPL parameters. By using knowledge distillation from the teacher network along with simple regularizers on the SMPL parameters, realistic 3D poses may be generated without requiring additional 3D information during training.

Second, previous approaches typically ignore the semantic gap between the SMPL 3D joints and the 2D landmarks while training. Instead, a regressor from vertices to joints is obtained offline by fitting SMPL meshes to specific 3D datasets (e.g., the Human3.6M dataset). In contrast, in various embodiments described herein, the semantic gap is bridged using semantic joint adaptation (SJA) during training of the student network. SJA may improve the accuracy as well as naturalness of the predicted 3D pose.

Figure 1:
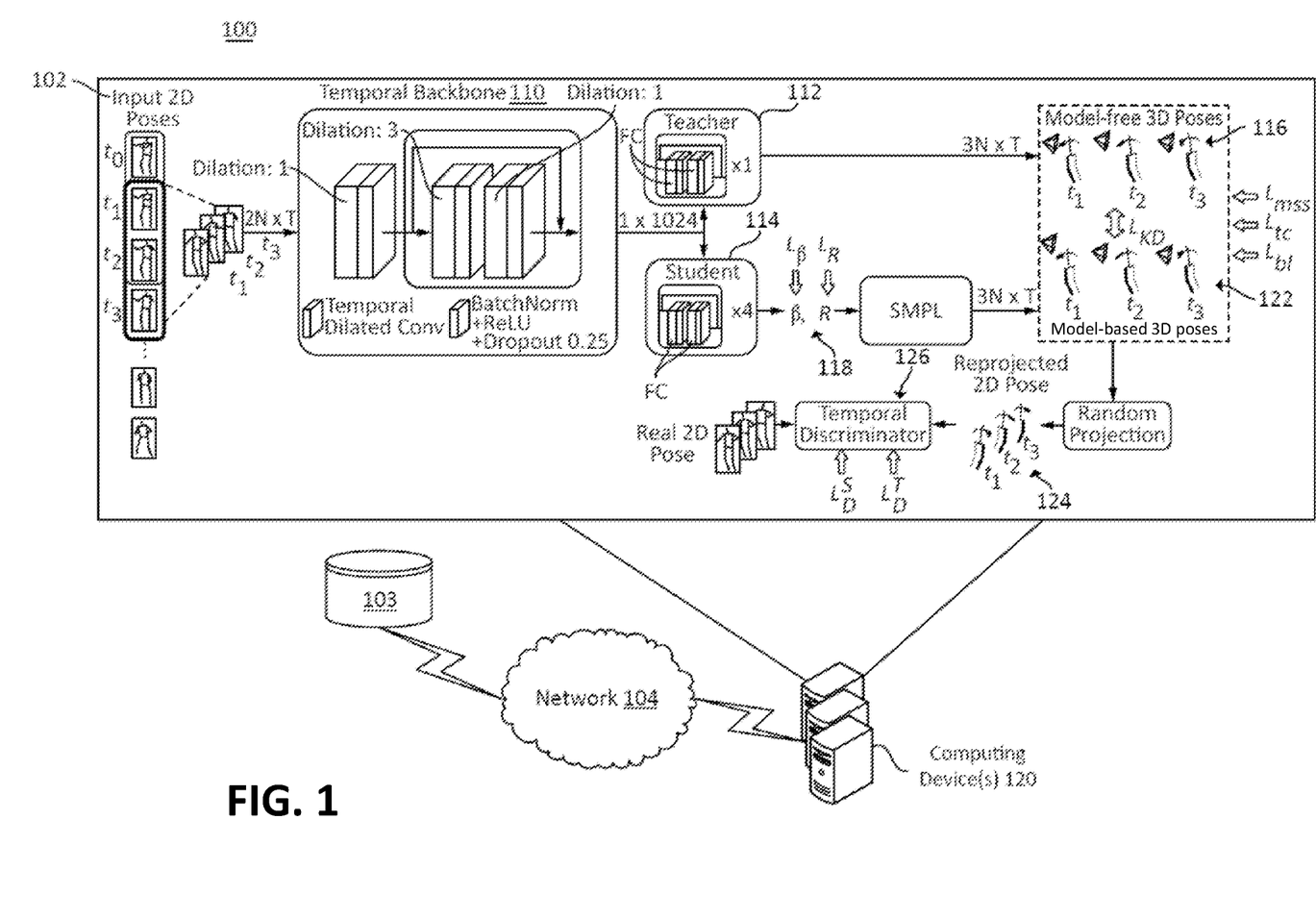
FIG. 1 is a diagram of an example system configured to generate three-dimensional poses and three-dimensional model parameters, according to various embodiments of the present disclosure.

FIG. 1 is a diagram of an example system 100 configured to perform three-dimensional pose estimation, according to various embodiments of the present disclosure. As depicted in FIG. 1, computing device(s) 120 may include a non-transitory computer-readable memory 103 and/or may be configured in communication with non-transitory computer-readable memory 103, such as over network 104. In various examples, network 104 may represent a local area network (LAN) and/or a wide area network (WAN) such as the internet.

Various 3D pose estimation techniques are described below in reference to FIG. 1, in accordance with various aspects of the present disclosure. In particular, an example system architecture, including loss functions, are depicted and described that enable generation of 3D pose estimations without using any 3D data either during training or inference.

The 3D pose estimation techniques described below in reference to FIG. 1 represent a combination of model-free 3D pose estimation followed by knowledge distillation to predict SMPL pose parameters. As shown in FIG. 1, the input 102 to the system 100 is a set of 2D skeletons (e.g., two-dimensional representations of forms including points representing joints and lines connecting the joints) from T consecutive frames of video data. The architecture comprises a temporal backbone 110 that uses dilated convolutions over time to model the temporal dynamics of the T consecutive input frames and produces a feature vector (e.g., a 1x1024 feature vector in the example depicted in FIG. 1). The feature vector is fed to two branches: a teacher network 112 that outputs 3D poses 116 (3D pose data comprising sets of 3D joints), and a student network 114 that outputs SMPL parameters 118. The 3D joints from the student branch (e.g., 3D poses 122) are computed as described below in Section 1.3. The 3D poses 116 from the teacher network 112 and the 3D poses 122 from the student network 114 are compared to ensure consistency. The predicted 3D joints from the teacher and the student networks are re-projected to 2D projections 124 (e.g., 2D projection image data representing a 2D projection of the 3D image data) after random rotations, and are fed to a temporal discriminator 126. The following sections describe the teacher network 112, the student network 114, and associated training losses in additional detail.

1.1. Teacher Network: Temporally-Consistent Lifting $x_i^j = (x_i^j, y_i^j)$, $i=1, \ldots, N$ denotes the $i^{th}$ 2D pose landmark of a skeleton in frame j with the root joint (e.g., the mid-point between the hip joints) as origin. The 2D skeleton for frame j is $x^j = \{X_1^j, \ldots, X_N^j\}$. The input 102 to the network at time step t is a set of T 2D skeletons represented as $x(t) = \{x^t, \ldots, x_{T-t+1}\}$. For simplicity, the dependence on the time-step may be dropped to describe the lifter. In various examples, a perspective camera may be assumed with unit focal length centered at the origin and the distance between the 3D skeleton and the camera being fixed at a constant c units. The 2D skeletons may be normalized such that the mean distance from the head joint to the root joint is units in 2D.

At each time-step t, the temporal lifting branch (e.g., teacher network 112) predicts a depth offset $o_i^j$ for each $x_i^j$. The 3D joints are computed as $X_i^j = (x_i^j, z_i^j, y_i^j, z_i^j, z_i^j)$, where $z_1^j = \max(1, c+o_i^j)$. The generated skeletons are projected back to 2D via random projections to generate re-projected 2D projections 124. Let Q be a random rotation matrix. The rotated 3D skeleton $Y_i^j$ is obtained as:

$$Y_i^j = Q(X_i^j - X_r^j) + C, \quad (1)$$

where $X_r^j$ is the predicted root joint of $j^{th}$ skeleton and $C = (0,0,c)^T$. Let $y_i^j$ denote the 2D projection of $Y_i^j$.

1.2. Training Losses for the Teacher Network

Multi-Frame Self-Supervision Loss: Let $\mathcal{G}_T$ denote the teacher network 112 that predicts the model-free 3D poses 116 $X_i^j = \mathcal{G}_T(X_i^j)$ as described in Section 1.1. The re-projected 2D projections 124 may also be lifted to 3D to obtain $\tilde{Y}_i^j = \mathcal{G}_T(Y_i^j)$ using the same network. If $\mathcal{G}_T(\cdot)$ is accurate, $Y_i^j$ should match $\tilde{Y}_i^j$. Therefore, the multi-frame self-supervision loss may be defined as:

$$\mathcal{L}_{mms} = \sum_i^N \sum_j^T \|Y_i^j - \tilde{Y}_i^j\|^2 \quad (2)$$

Temporal Consistency Loss: Since T 3D skeletons are predicted at each time step t, common frames exists between neighboring time-steps. Using a sliding window with temporal stride 1, there are T-1 frames in common between time-step t and t+1. An $\mathcal{L}_2$ loss may be used to enforce consistency between the common frames in 3D:

$$\mathcal{L}_{tc} = \sum_{j=1}^{T-1} \|X_i^{j+1}(t) - X_i^j(t+1)\|^2 \quad (3)$$

Bone Length Loss: At each time step t, consistency between the bone lengths for the T predicted 3D skeletons may be enforced by minimizing the variance of bone lengths over the T frames. Let $b(m, n, j) = \|X_m^j - X_n^j\|$ denote the bone length between the $m^{th}$ and $n^{th}$ predicted 3D joints for frame j. Bone length loss may be defined as:

$$\mathcal{L}_{bl} = \sum_{m=1}^N \sum_{n \in N(m)} \text{Var}_j(b(m, n, j)) \quad (4)$$

where N(m) denotes the set of connected skeleton joints for joint m and $\text{Var}_j$ denotes variance over T frames.

Temporal Discriminator: The discriminator 126 may provide feedback to the lifter (e.g., to temporal backbone 110 and/or teacher network 112) regarding the realism of re-projected 2D projections 124. In contrast to some previous approaches that use a single frame discriminator and a frame-difference discriminator, in various embodiments herein a single temporal discriminator 126 may be used that takes a set of T re-projected/real 2D skeletons as input. Previous approaches have used RNN and LSTM to model sequential/temporal data. A challenge in using RNN/LSTM is delayed feedback which requires the use of a policy gradient to back-propagate the feedback from the discriminator. In contrast, the temporal discriminator 126 uses dilated convolutions and provides feedback at each time-step, simplifying the training. Formally, the discriminator 126 is trained to distinguish between sequences of T real 2D skeletons $r(t) = \{r^1, \ldots, r^T\}$ (target probability of 1) and fake (projected) 2D skeletons $y(t) = \{y^1, \ldots, y^T\}$ (target probability of 0). We utilize a standard adversarial loss defined as:

$$\mathcal{L}_D^T = \min_{\theta_T} \max_{\theta_D} \mathbb{E}(\log(D(r(t))) + \log(1 - D(y(t)))) \quad (5)$$

where $\theta_T$ and $\theta_D$ denote the parameters of the teacher network 112 and the discriminator 126, respectively.

1.3. Student Network: Estimating SMPL Parameters

For the model-based approach, the Skinned Multi-Person Linear (SMPL) representation may be used. SMPL is a parametric model that factors human bodies into a shape (body proportions) and pose (articulation) representation. The shape is parameterized using a PCA subspace with 300 basis shapes and shape coefficients (β) The human pose is modeled as a set of 24 local joint angles corresponding to K=24 3D joints (including root joint) and is represented as 72 axis-angle coefficients. The rotation matrix corresponding to each joint from the network is directly predicted. In addition, a differentiable ortho-normalization may be performed on the rotation matrices. Let $\mathcal{R} = \{R_1, \ldots, R_K\}$ denote the set of K rotation matrices. Given a set of SMPL parameters β and $\mathcal{R}$, SMPL produces a mesh V=M(β, $\mathcal{R}$), V∈$\mathcal{R}^{6890 \times 3}$ with 6890 vertices, where M is differentiable. Note that the 3D joints by themselves do not fully constrain the shape of the body and it is not possible to predict accurate shape using 3D joints alone. In various example embodiments, the first 10 parameters (common for all T frames) may be predicted and the remaining parameters may be set to zero. Thus, the student network 114 has a total of 10+24x9xT=10+216x T outputs at each time step.

1.3.1 Semantic Joint Adaptation (SJA)

The 3D joints J∈$\mathbb{R}^{24 \times 3}$ are obtained by linear regression from the final mesh vertices V. The linear regressor is a sparse matrix W∈$\mathbb{R}^{24 \times 6890}$ which represents a convex combination of vertices for each 3D joint. Hence, J=WV. The pre-trained linear regressor in SMPL produces 3D joints that are often semantically different from the 2D joints obtained from 2D pose detectors or annotations on datasets. For example, in SMPL the 3D hip joints are closer to the center of the body. However, in Hu-man3.6M 2D annotations, the hip landmarks are closer to the periphery. In various embodiments, the SJA approach described herein learns the adaptation of the SMPL 3D joints to 2D joints used for training.

In one approach, a linear layer that learns a weight matrix A∈$\mathbb{R}^{72 \times 72}$ and an bias vector b∈$\mathbb{R}^{72 \times 1}$ may be used. The linear layer may be applied to the 72x1 vectorized representation of J to adapt the SMPL joints to 2D joints (referred to as Linear-SJA) according to:

$$J' = AJ + b. \quad (6)$$

Figure 2:
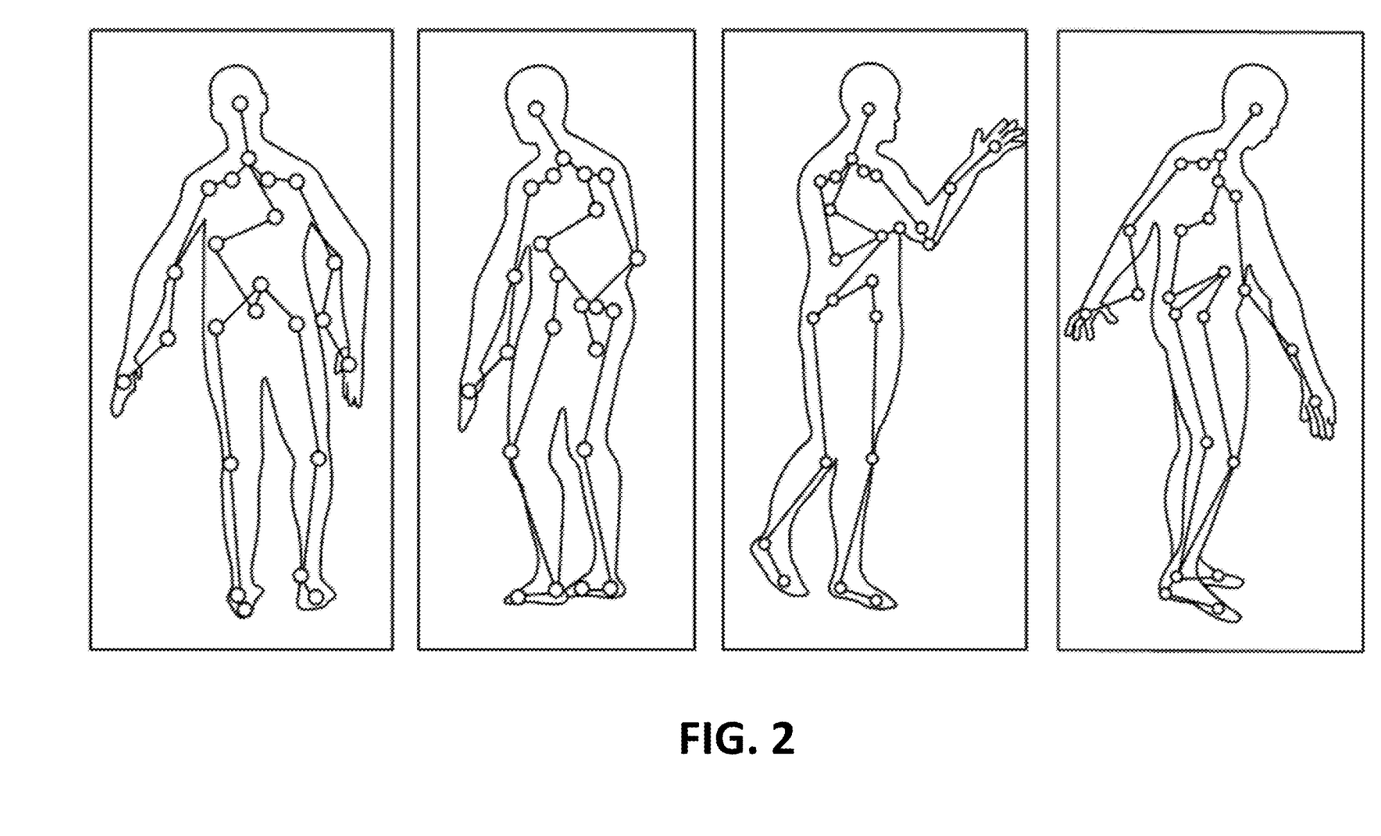
FIG. 2 depicts examples of an adaptation of three-dimensional joints to two-dimensional joints using a linear semantic joint adaptation.
Figure 3:
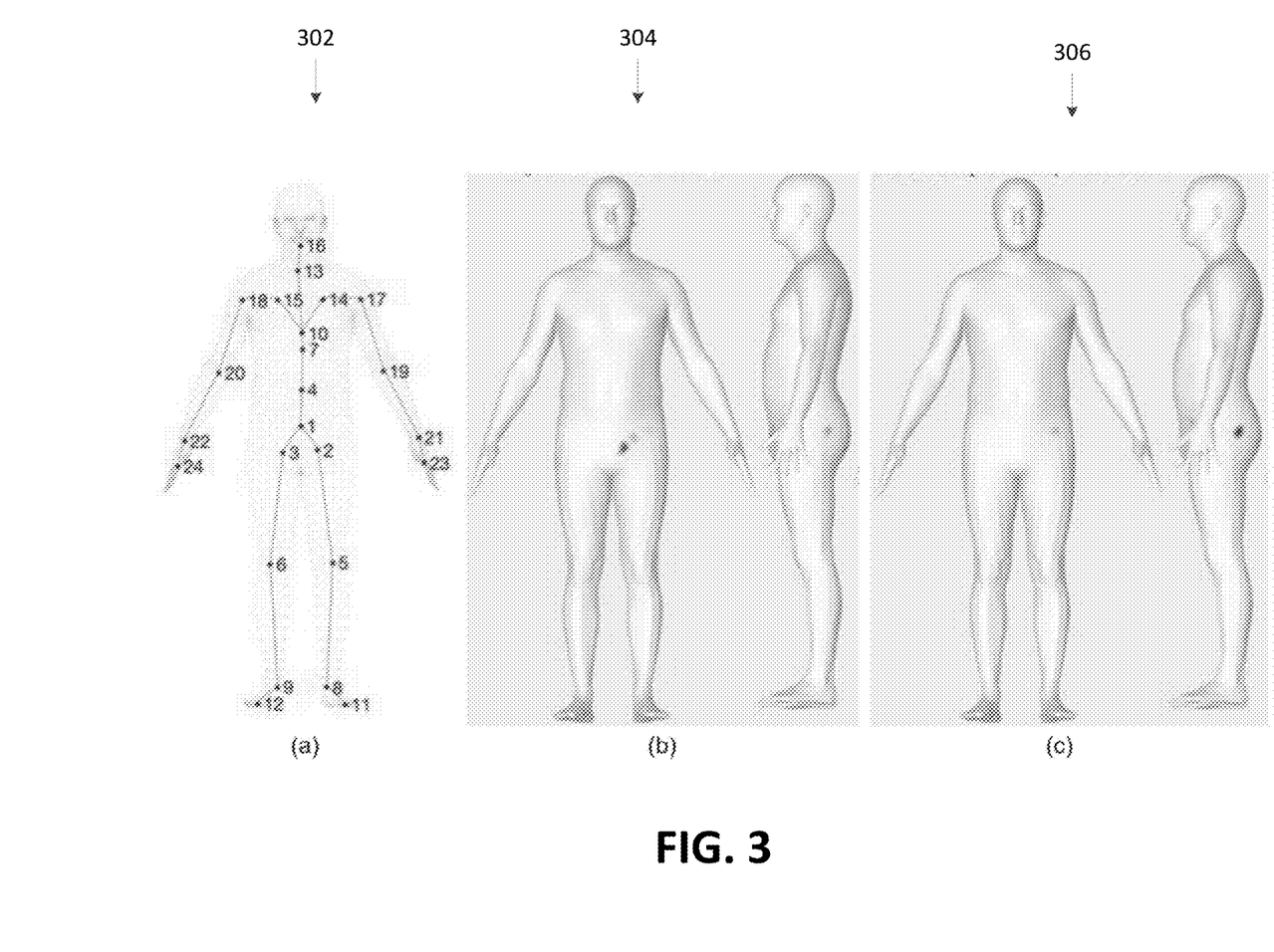
FIG. 3 depicts representations of human poses with joints adapted using a learned convex combination of vertices, in accordance with various aspects of the present disclosure.

However, such an approach may not be optimal. Since there is no constraint on joints, the network can potentially learn to minimize the joint error by moving the SMPL joints outside the body (see FIG. 2 where some joints in the depicted human's arm are moved outside the mesh). To avoid such pitfalls, similar to SMPL, a convex combination of vertices W' is learned, resulting in 24x6890=165,360 additional learnable parameters. The new joints are obtained as'=W'V. Visualization in FIG. 3 shows that weights for the learned regressor on Human3.6M shifts from the center of body in 302 towards the surface in 304, corresponding to a similar shift in 2D hip landmarks. Accordingly, SJA, as used herein, may refer to the learned convex combination of vertices.

Image 302 of FIG. 3 depicts original SMPL 3D joints. Image 304 of FIG. 3 depicts SMPL regression weights for the left-hip joint visualized by assigning a color to each vertex (darker color corresponding to a higher weight. Image 306 of FIG. 3 depicts updated regressor weights for the left hip joint after using the learned convex combination of vertices SJA.

1.4. Training Losses for the Student Network

The following losses are used to train the student network 114 via knowledge distillation.

Knowledge Distillation Loss: Knowledge distillation loss is defined as a loss between the model-free prediction of 3D poses $X_i^j$ (116) and the 3D joints obtained via the SMPL model (3D poses 122). To account for the mismatch between the number of joints, N relevant joints may be selected (e.g., 14, 16, and/or some other suitable number) from the 24 SMPL joints. I(i) may denote the index of the SMPL joint corresponding to $i^{th}$ input 2D joint. $L_{KD}$ may be computed as a sum of individual losses over each joint i and each frame j:

$$\mathcal{L}_{KD} = \sum_{j=1}^{T} \sum_{i=1}^{N} \left\| X_i^j - W'_{I(i)} M(\beta, \mathcal{R}^j) \right\|^2 \quad (7)$$

where $W'_{I(i)}$ denotes the row of matrix W' corresponding to the regressor weights for joint I(i) and $\mathcal{R}^j$ denotes the set of predicted rotation matrices for frame j.

Regularization of SMPL Parameters: In absence of any 3D data, a regularizer may be used for pose parameters to avoid over-twisting by penalizing the deviation of the predicted rotation matrices from identity rotation.

$$\mathcal{L}_\theta = \sum_{j=1}^{T} \sum_{i=1}^{K} \left\| R_i^j - I_{3 \times 3} \right\|^2 \quad (8)$$

where $I_{3 \times 3}$ is the 3x3 identity matrix. A similar $\mathcal{L}_2$ regularizer may be used for β, $\mathcal{L}_\beta = \|\beta\|^2$, since β=0 represents the average human shape. The β regularizer may be used with a relatively larger weight during training to keep the shape close to the average shape. However, in at least some examples, without SJA these regularizers by themselves may be insufficient to avoid unnatural predictions. The novel SJA approach (e.g., learned convex combination of vertices) helps improve the realism and naturalness of predicted pose parameters.

Discriminator: Similar to the teacher network, the predicted 3D joints from the student network 114 are re-projected to random views (2D projections 124) and fed to the discriminator 126. The corresponding discriminator loss is $\mathcal{L}_D^S$, similar to $\mathcal{L}_D^T$ in equation 5, above.

1.5. Training System 100

In an example embodiment, the system 100 may be trained using the following steps:

1. Train teacher network 112 (and temporal backbone 110): Train the shared temporal convolution backbone and the teacher network by minimizing $\mathcal{L}_T = \lambda_{mss} \mathcal{L}_{mss} + \lambda_{tc} \mathcal{L}_{tc} + \lambda_{bl} \mathcal{L}_{bl} + \mathcal{L}_D^T$.

2. Knowledge Distillation: Freeze the shared temporal backbone and the teacher network. Train the student network 114 by minimizing $\mathcal{L}_S = \mathcal{L}_{KD} + \lambda_R \mathcal{L}_\theta + \lambda_\beta \mathcal{L}_\beta$.

3. Learn SJA: Initialize W' to W. Fine-tune W' and the student network 114 by minimizing $\mathcal{L}_S$.

4. Fine-tune the entire system 100 by minimizing $\mathcal{L} = \mathcal{L}_T + \lambda_S \mathcal{L}_S + \mathcal{L}_D^S$.

Hyper-parameters $\lambda_{mss}, \lambda_{tc}, \lambda_{bl}, \lambda_R, \lambda_\beta, \lambda_S$ are defined in section 2.1. Note that in step 4, the re-projection of the 3D pose (e.g., re-projected 2D projections 124) predicted from both the teacher and student networks may be input to the discriminator during step 4.

2.1. Example Implementation

Example implementation details are described below. It should be appreciated that other implementation details may be used apart from those explicitly described below, in accordance with a desired implementation. In an example implementation, N=14 joints may be used and T=9 frame sub-sequences of 2D poses may be randomly sampled from video sequences for training. The input poses may be normalized such that the mean distance from the head joint to the root joint is 0.1 units, corresponding to placing the 3D skeletons at c=10 units from the camera. As shown in FIG. 1, the temporal backbone 110 may be configured to take a 2NxT input followed by a cony-block, comprising a convolution filter, batchnorm, ReLU, and dropout. Each convolution filter may have 1024 channels with a kernel size of 3x1 and temporal dilation factor of d=1. The output of the cony-block may be fed to a residual block with two cony-blocks, with a dilation ratio of d=3 and d=1, respectively. The teacher branch (e.g., temporal backbone 110 and teacher network 112) may comprise an additional residual block with 2 fully-connected (FC) layers of size 1024 each. Similarly, the student network 114 may comprise 4 FC residual blocks. The temporal discriminator 126 may be the same as the temporal backbone architecture but may not use BatchNorm. In various example embodiments, the loss weights may be set as $\lambda_{mss}=2$, $\lambda_{tc}=1$, $\lambda_{bl}=2$, $\lambda_{R}=30$, $\lambda_{\beta}=10$ and $\lambda_{S}=2$. It should be appreciated that the foregoing implementation details represent only one possible implementation. Different implementations are explicitly contemplated and may be varied and/or tuned in accordance with the particular goals of the implementation.

Figure 4:
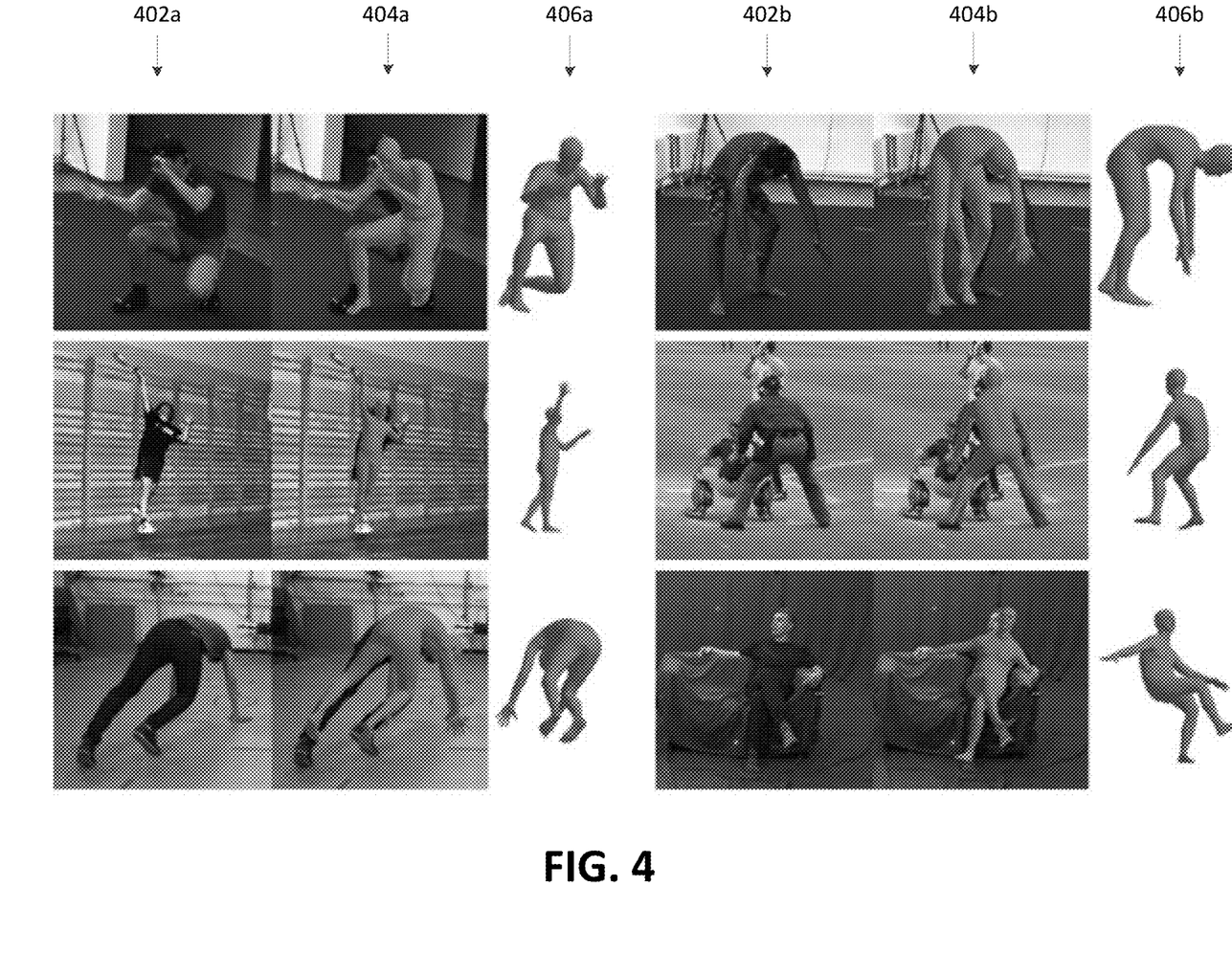
FIG. 4 depicts examples of input two-dimensional data and three-dimensional pose data generated using the system described above in FIG. 1, in accordance with various aspects of the present disclosure.

FIG. 4 depicts visualizations of the SMPL mesh obtained using predicted parameters in accordance with the various training techniques described herein for system 100. Each example shows an input image (e.g., input images 402a, 402b), generated SMPL meshes (e.g., SMPL meshes 404a, 404b), and the same SMPL mesh from a different view (e.g., rotated SMPL meshes 406a, 406b). The student network 114 is able to recover complicated articulations of the human body. In the examples depicted in FIG. 4, the first row of images was generated using the H3.6M dataset. The second row of images was generated using the LSP dataset. The third row of images was generated using the MPI-INF-3DHP dataset.

Figure 5:
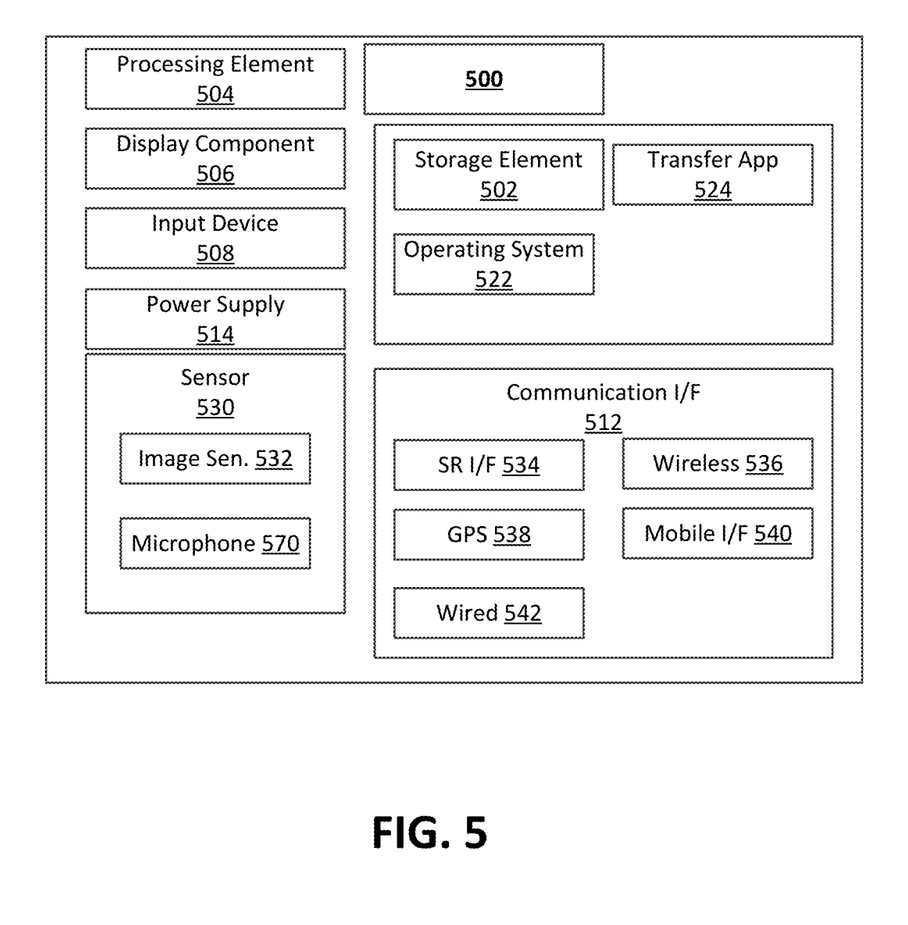
FIG. 5 is a block diagrams showing an example architecture of a computing device that may be used in accordance with various embodiments described herein.

FIG. 5 is a block diagram showing an example architecture 500 of a computing device that may be used to generate estimated 3D poses from 2D pose inputs, in accordance with various aspects of the present disclosure. It will be appreciated that not all devices will include all of the components of the architecture 500 and some user devices may include additional components not shown in the architecture 500. The architecture 500 may include one or more processing elements 504 for executing instructions and retrieving data stored in a storage element 502. The processing element 504 may comprise at least one processor. Any suitable processor or processors may be used. For example, the processing element 504 may comprise one or more digital signal processors (DSPs). The storage element 502 can include one or more different types of memory, data storage, or computer-readable storage media devoted to different purposes within the architecture 500. For example, the storage element 502 may comprise flash memory, random-access memory, disk-based storage, etc. Different portions of the storage element 502, for example, may be used for program instructions for execution by the processing element 504, storage of images or other digital works, and/or a removable storage for transferring data to other devices, etc. Additionally, storage element 502 may store parameters, and/or machine learning models generated using the various techniques described herein.

The storage element 502 may also store software for execution by the processing element 504. An operating system 522 may provide the user with an interface for operating the computing device and may facilitate communications and commands between applications executing on the architecture 500 and various hardware thereof. A transfer application 524 may be configured to receive images, audio, and/or video from another device (e.g., a mobile device, image capture device, and/or display device) or from an image sensor 532 and/or microphone 570 included in the architecture 500.

When implemented in some user devices, the architecture 500 may also comprise a display component 506. The display component 506 may comprise one or more light-emitting diodes (LEDs) or other suitable display lamps. Also, in some examples, the display component 506 may comprise, for example, one or more devices such as cathode ray tubes (CRTs), liquid-crystal display (LCD) screens, gas plasma-based flat panel displays, LCD projectors, raster projectors, infrared projectors or other types of display devices, etc. As described herein, display component 506 may be effective to display input images and/or 3D pose image data generated in accordance with the various techniques described herein.

The architecture 500 may also include one or more input devices 508 operable to receive inputs from a user. The input devices 508 can include, for example, a push button, touch pad, touch screen, wheel, joystick, keyboard, mouse, trackball, keypad, light gun, game controller, or any other such device or element whereby a user can provide inputs to the architecture 500. These input devices 508 may be incorporated into the architecture 500 or operably coupled to the architecture 500 via wired or wireless interface. In some examples, architecture 500 may include a microphone 570 or an array of microphones for capturing sounds, such as voice requests. In various examples, audio captured by microphone 570 may be streamed to external computing devices via communication interface 512.

When the display component 506 includes a touch-sensitive display, the input devices 508 can include a touch sensor that operates in conjunction with the display component 506 to permit users to interact with the image displayed by the display component 506 using touch inputs (e.g., with a finger or stylus). The architecture 500 may also include a power supply 514, such as a wired alternating current (AC) converter, a rechargeable battery operable to be recharged through conventional plug-in approaches, or through other approaches such as capacitive or inductive charging.

The communication interface 512 may comprise one or more wired or wireless components operable to communicate with one or more other computing devices. For example, the communication interface 512 may comprise a wireless communication module 536 configured to communicate on a network, such as the network 104, according to any suitable wireless protocol, such as IEEE 802.11 or another suitable wireless local area network (WLAN) protocol. A short range interface 534 may be configured to communicate using one or more short range wireless protocols such as, for example, near field communications (NFC), Bluetooth, Bluetooth LE, etc. A mobile interface 540 may be configured to communicate utilizing a cellular or other mobile protocol. A Global Positioning System (GPS) interface 538 may be in communication with one or more earth-orbiting satellites or other suitable position-determining systems to identify a position of the architecture 500. A wired communication module 542 may be configured to communicate according to the USB protocol or any other suitable protocol.

The architecture 500 may also include one or more sensors 530 such as, for example, one or more position sensors, image sensors, and/or motion sensors. An image sensor 532 is shown in FIG. 5. Some examples of the architecture 500 may include multiple image sensors 532. For example, a panoramic camera system may comprise multiple image sensors 532 resulting in multiple images and/or video frames that may be stitched and may be blended to form a seamless panoramic output. An example of an image sensor 532 may be a camera configured to capture color information, image geometry information, and/or ambient light information.

As noted above, multiple devices may be employed in a single system. In such a multi-device system, each of the devices may include different components for performing different aspects of the system's processing. The multiple devices may include overlapping components. The components of the computing device(s) 120, as described herein, are exemplary, and may be located as a stand-alone device or may be included, in whole or in part, as a component of a larger device or system.

Figure 6:
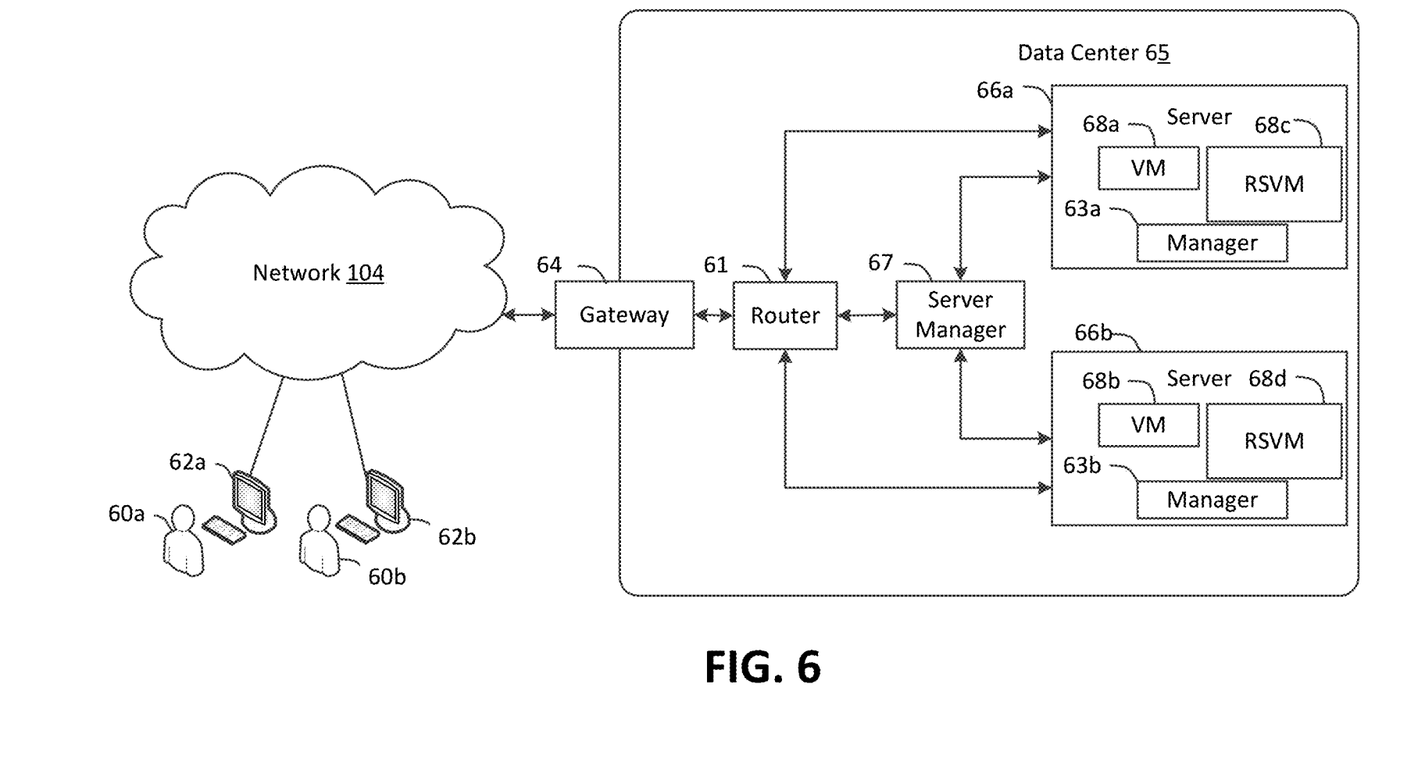
FIG. 6 is a diagram illustrating an example system for sending and providing data that may be used in accordance with the present disclosure.

An example system for sending and providing data will now be described in detail. In particular, FIG. 6 illustrates an example computing environment in which the embodiments described herein may be implemented. For example, the computing environment of FIG. 6 may be used to provide 3D pose generation as a service over a network wherein one or more of the techniques described herein may be requested by a first computing device and may be performed by a different computing device configured in communication with the first computing device over a network. FIG. 6 is a diagram schematically illustrating an example of a data center 65 that can provide computing resources to users 60*a* and 60*b* (which may be referred herein singularly as user 60 or in the plural as users 60) via user computers 62*a* and 62*b* (which may be referred herein singularly as user computer 62 or in the plural as user computers 62) via network 104. Data center 65 may be configured to provide computing resources for executing applications on a permanent or an as-needed basis. The computing resources provided by data center 65 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. In various examples, the instances may be configured to execute one or more of the various 3D pose generation techniques described herein.

These services may be configurable with set or custom applications and may be configurable in size, execution, cost, latency, type, duration, accessibility and in any other dimension. These web services may be configured as available infrastructure for one or more clients and can include one or more applications configured as a system or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 65 may include servers 66*a* and 66*b* (which may be referred herein singularly as server 66 or in the plural as servers 66) that provide computing resources. These resources may be available as bare metal resources or as virtual machine instances 68*a-d* (which may be referred herein singularly as virtual machine instance 68 or in the plural as virtual machine instances 68). In at least some examples, server manager 67 may control operation of and/or maintain servers 66. Virtual machine instances 68*c* and 68*d* are rendition switching virtual machine ("RSVM") instances. The RSVM virtual machine instances 68*c* and 68*d* may be configured to perform all, or any portion, of the techniques for improved rendition switching and/or any other of the disclosed techniques in accordance with the present disclosure and described in detail above. As should be appreciated, while the particular example illustrated in FIG. 6 includes one RSVM virtual machine in each server, this is merely an example. A server may include more than one RSVM virtual machine or may not include any RSVM virtual machines.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 6, network 104 may, for example, be a publicly accessible network of linked networks and possibly operated by various distinct parties, such as the Internet. In other embodiments, network 104 may be a private network, such as a corporate or university network that is wholly or partially inaccessible to non-privileged users. In still other embodiments, network 104 may include one or more private networks with access to and/or from the Internet.

Network 104 may provide access to user computers 62. User computers 62 may be computers utilized by users 60 or other customers of data center 65. For instance, user computer 62a or 62b may be a server, a desktop or laptop personal computer, a tablet computer, a wireless telephone, a personal digital assistant (PDA), an e-book reader, a game console, a set-top box or any other computing device capable of accessing data center 65. User computer 62a or 62b may connect directly to the Internet (e.g., via a cable modem or a Digital Subscriber Line (DSL)). Although only two user computers 62a and 62b are depicted, it should be appreciated that there may be multiple user computers.

User computers 62 may also be utilized to configure aspects of the computing resources provided by data center 65. In this regard, data center 65 might provide a gateway or web interface through which aspects of its operation may be configured through the use of a web browser application program executing on user computer 62. Alternately, a stand-alone application program executing on user computer 62 might access an application programming interface (API) exposed by data center 65 for performing the configuration operations. Other mechanisms for configuring the operation of various web services available at data center 65 might also be utilized.

Servers 66 shown in FIG. 6 may be servers configured appropriately for providing the computing resources described above and may provide computing resources for executing one or more web services and/or applications. In one embodiment, the computing resources may be virtual machine instances 68. In the example of virtual machine instances, each of the servers 66 may be configured to execute an instance manager 63a or 63b (which may be referred herein singularly as instance manager 63 or in the plural as instance managers 63) capable of executing the virtual machine instances 68. The instance managers 63 may be a virtual machine monitor (VMM) or another type of program configured to enable the execution of virtual machine instances 68 on server 66, for example. As discussed above, each of the virtual machine instances 68 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 65 shown in FIG. 6, a router 61 may be utilized to interconnect the servers 66a and 66b. Router 61 may also be connected to gateway 64, which is connected to network 104. Router 61 may be connected to one or more load balancers, and alone or in combination may manage communications within networks in data center 65, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 65 shown in FIG. 6, a data center 65 is also employed to at least in part direct various communications to, from and/or between servers 66a and 66b. While FIG. 6 depicts router 61 positioned between gateway 64 and data center 65, this is merely an exemplary configuration. In some cases, for example, data center 65 may be positioned between gateway 64 and router 61. Data center 65 may, in some cases, examine portions of incoming communications from user computers 62 to determine one or more appropriate servers 66 to receive and/or process the incoming communications. Data center 65 may determine appropriate servers to receive and/or process the incoming communications based on factors such as an identity, location or other attributes associated with user computers 62, a nature of a task with which the communications are associated, a priority of a task with which the communications are associated, a duration of a task with which the communications are associated, a size and/or estimated resource usage of a task with which the communications are associated and many other factors. Data center 65 may, for example, collect or otherwise have access to state information and other information associated with various tasks in order to, for example, assist in managing communications and other operations associated with such tasks.

It should be appreciated that the network topology illustrated in FIG. 6 has been greatly simplified and that many more networks and networking devices may be utilized to interconnect the various computing systems disclosed herein. These network topologies and devices should be apparent to those skilled in the art.

It should also be appreciated that data center 65 described in FIG. 6 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, used to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution systems (such as application server instances, Java™ virtual machines (JVMs), general-purpose or special-purpose operating systems that support various interpreted or compiled programming languages such as Ruby, Perl, Python, C, C++ and the like or high-performance computing systems) suitable for the applications, without, for example, requiring the client to access an instance or an execution system directly. A given execution system may utilize one or more resource instances in some implementations; in other implementations, multiple execution systems may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware system, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Figure 7:
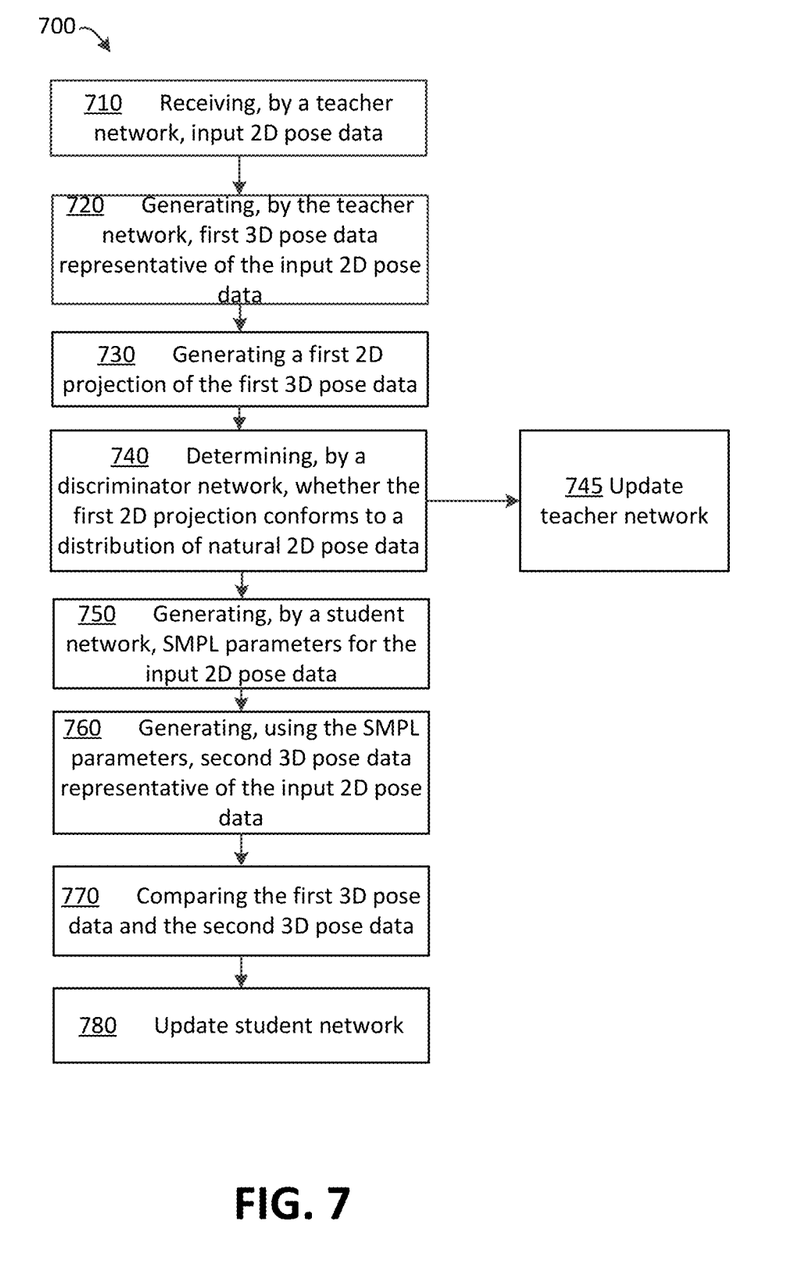
FIG. 7 is a flow chart depicting an example process for generating a system effective to generate three-dimensional pose data using two-dimensional input data, in accordance with various aspects of the present disclosure.

FIG. 7 is a flow chart depicting an example process 700 for generating a system effective to generate three-dimensional pose data using two-dimensional input data, in accordance with various aspects of the present disclosure. Those portions of FIG. 7 that have been previously discussed in reference to FIGS. 1-6 may not be described again for purposes of clarity and brevity. The actions of the process 700 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

Process 700 of FIG. 7 may begin at action 710, "Receiving, by a teacher network, input 2D pose data." At action 710, a teacher network (e.g., a network comprising temporal backbone 110 and teacher network 112) may receive 2D pose data as an input. The 2D pose data may comprise a sequence of frames of 2D image data (e.g., from a video), where each frame includes a plurality of joints with lines connecting the joints to form a 2D pose of a figure and/or object.

Processing may continue from action 710 to action 720, "Generating, by the teacher network, first 3D pose data representative of the input 2D pose data." At action 720, the teacher network may perform one or more convolution operations in order to lift the input 2D pose data into first 3D pose data, comprising the joints and the lines connecting the joints from the input 2D pose data represented in three dimensions as a 3D shape. As described above, the teacher network 112 may predict a depth offset for each joint $x_i^j$. The temporal backbone 110 may be considered part of the teacher network and/or teacher branch and may perform dilated convolutions over time to model the temporal dynamics of consecutive input frames in order to generate a vector that is representative of the changing 2D pose data over time. The vector may be input into a teacher branch that may predict the depth offset for each joint in order to "lift" the 2D joints into 3D pose data.

Processing may continue from action 720 to action 730, at which a first 2D projection of the 3D pose data may be generated. Any suitable 3D projection method may be used to generate the 2D projection of the 3D pose data (e.g., parallel projection, multiview projection, etc.).

Processing may continue from action 730 to action 740 at which a discriminator network (e.g., part of an adversarial network) may compare the 2D projection of the 3D pose data generated by the teacher network to a distribution of natural 2D pose data (e.g., real images of 2D poses of the relevant object, human, animal, etc.) to make a determination as to whether the 2D projection is "natural" or fake/synthetic. If the discriminator is able to correctly identify that the 2D projection is fake, loss may be back propagated to the teacher network and/or to the temporal backbone at action 745 in order to update the models. Accordingly, the teacher network may be trained over time using the discriminator to generate 3D pose data that conforms to a distribution of natural 2D pose data when projected in two dimensions.

Processing may continue from action 740 to action 750, at which a student network may generate SMPL parameters for the input 2D pose data. As previously described, student network 114 may generate SMPL parameters that may be used to generate a SMPL mesh (e.g., model-based 3D pose data). The model-based 3D pose data generated by the student branch of system 100 (e.g., at action 760) may also be projected into 2D and fed to the discriminator, as described above with respect to the teacher branch. Accordingly, the discriminator (e.g., discriminator 126) may also be used to update the student network 114 to generate more realistic SMPL parameters that may, in turn, be used to generate more realistic 3D pose data.

At action 770, the first 3D pose data generated by the teacher branch (e.g., teacher network 112 and temporal backbone 110) may be compared (e.g., on a frame-by-frame basis) to the SMPL model-based 3D pose data generated by the student branch (e.g., student network 114 and the SMPL algorithm used to generate a SMPL mesh). The 3D pose data generated by the teacher branch may be considered pseudo-ground truth and the differences between the models may be quantified as a knowledge distillation loss. This loss may be back-propagated at action 780 and may be used to update parameters of the student network.

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A method of generating three-dimensional (3D) pose data, comprising:
   receiving, by a teacher network of a teacher-student knowledge distillation network, input two-dimensional (2D) pose data;
   generating, by the teacher network using at least one convolution operation, first 3D pose data representative of the input 2D pose data;
   generating first 2D projection image data representing a 2D projection of the first 3D pose data;
   determining, by a discriminator network, that the first 2D projection image data conforms to a distribution of natural 2D pose data;
   generating, by a student network of the teacher-student knowledge distillation network, skinned multi-person linear (SMPL) parameters for the input 2D pose data;
   generating, using the SMPL parameters, second 3D pose data representative of the input 2D pose data;
   determining a loss describing a difference between the first 3D pose data and the second 3D pose data; and
   updating parameters of the student network to minimize the loss.

2. The method of claim 1, further comprising:
   receiving, by the teacher network, second input 2D pose data;
   generating, by the teacher network, third 3D pose data representative of the second input 2D pose data;

generating second 2D projection image data representing a 2D projection of the third 3D pose data;
determining, by the discriminator network, an adversarial loss representing a difference between the second 2D projection image data and the distribution of natural 2D pose data; and
updating parameters of the teacher network to minimize the adversarial loss.

3. The method of claim 1, further comprising:
generating second 2D projection image data representing a 2D projection of the second 3D pose data;
determining, by the discriminator network, an adversarial loss representing a difference between the second 2D projection image data and the distribution of natural 2D pose data; and
updating the parameters of the student network to minimize the loss.

4. The method of claim 1, further comprising:
receiving, by the teacher network, second input 2D pose data comprising a sequence of frames of a video;
generating, by the teacher network, 3D pose data comprising a plurality 3D poses, wherein each 3D pose of the plurality of 3D poses represents a respective frame of the sequence of frames of the video;
generating a set of 2D projections comprising respective 2D projection image data for each of the plurality of 3D poses;
determining, by the discriminator network, an adversarial loss representing a difference between the set of 2D projections and the distribution of natural 2D pose data; and
updating parameters of the teacher network to minimize the adversarial loss.

5. A method comprising:
receiving, by a first machine learning network, input two-dimensional (2D) data;
generating, by the first machine learning network, first three-dimensional (3D) data representing the input 2D data;
generating first 2D projection image data representing a 2D projection of the first 3D data;
determining that the first 2D projection image data conforms to a distribution of 2D data;
generating, by a second machine learning network, parameters of a 3D model based at least in part on the input 2D data and based at least in part on the first 3D data;
generating second 3D data using the parameters of the 3D model;
generating second 2D projection image data representing a 2D projection of the second 3D data;
determining an adversarial loss representing a difference between the second 2D projection image data and the distribution of 2D data; and
updating parameters of the second machine learning network to minimize the adversarial loss.

6. The method of claim 5, further comprising:
determining a loss comprising a difference between the first 3D data and the second 3D data; and
further updating the parameters of the second machine learning network to minimize the loss.

7. The method of claim 5, further comprising:
receiving, by the first machine learning network, second input 2D data;
generating, by the first machine learning network, third 3D data representative of the second input 2D data;
generating second 2D projection image data representing a 2D projection of the third 3D data;
determining, by a discriminator network, an adversarial loss representing a difference between the second 2D projection image data and the distribution of 2D data; and
updating parameters of the first machine learning network to minimize the adversarial loss.

8. The method of claim 5, further comprising:
generating second 2D projection image data representing a 2D projection of the first 3D data at least in part by rotating the first 3D data;
determining an adversarial loss representing a difference between the second 2D projection image data and the distribution of 2D data; and
generating an updated second machine learning network.

9. The method of claim 5, further comprising:
receiving, by the first machine learning network at a time t, a first segment of video data comprising second input 2D data and third input 2D data, the second input 2D data being a first frame of the video data and the third input 2D data being a second frame of the video data;
generating, by the first machine learning network, third 3D data representing the second input 2D data;
generating, by the first machine learning network, fourth 3D data representing the third input 2D data;
receiving, by the first machine learning network at a time t+1, a second segment of the video data comprising the third input 2D data and fourth input 2D data, the fourth input 2D data being a third frame of the video data;
generating, by the first machine learning network, fifth 3D data representing the third input 2D data;
generating, by the first machine learning network, sixth 3D data representing the fourth input 2D data;
determining a difference between the fifth 3D data and the fourth 3D data; and
updating the first machine learning network based at least in part on the difference.

10. The method of claim 5, further comprising:
inputting the first 2D projection image data into the first machine learning network;
generating, by the first machine learning network, third 3D data representing the first 2D projection image data;
determining a difference between the first 3D data and the third 3D data; and
updating the first machine learning network based at least in part on the difference.

11. The method of claim 5, further comprising:
generating, by the first machine learning network, third 3D data representing the input 2D data;
determining a first length between a first joint and a second joint as represented in the first 3D data;
determining a second length between the first joint and the second joint as represented in the third 3D data;
determining a difference between the first length and the second length; and
updating the first machine learning model based at least in part on the difference.

12. A system comprising:
at least one processor; and
at least one non-transitory computer-readable memory storing instructions that, when executed by the at least one processor, are effective to program the at least one processor to:
receive, by a first machine learning network, input two-dimensional (2D) data;

generate, by the first machine learning network, first three-dimensional (3D) data representing the input 2D data;
generate first 2D projection image data representing a 2D projection of the first 3D data;
determine that the first 2D projection image data conforms to a distribution of 2D data;
generate, by a second machine learning network, parameters of a 3D model based at least in part on the input 2D data and based at least in part on the first 3D data;
generate second 3D data using the parameters of the 3D model;
generate second 2D projection image data representing a 2D projection of the second 3D data;
determine an adversarial loss representing a difference between the second 2D projection image data and the distribution of 2D data; and
update parameters of the second machine learning network to minimize the adversarial loss.

13. The system of claim 12, the at least one non-transitory computer-readable memory storing further instructions that, when executed by the at least one processor, are further effective to program the at least one processor to:
determine a loss comprising a difference between the first 3D data and the second 3D data; and
further update the parameters of the second machine learning network to minimize the loss.

14. The system of claim 12, the at least one non-transitory computer-readable memory storing further instructions that, when executed by the at least one processor, are further effective to program the at least one processor to:
receive, by the first machine learning network, second input 2D data;
generate, by the first machine learning network, third 3D data representative of the second input 2D data;
generate second 2D projection image data representing a 2D projection of the third 3D data;
determine, by a discriminator network, an adversarial loss representing a difference between the second 2D projection image data and the distribution of 2D data; and
updating parameters of the first machine learning network to minimize the adversarial loss.

15. The system of claim 12, the at least one non-transitory computer-readable memory storing further instructions that, when executed by the at least one processor, are further effective to program the at least one processor to:
generate second 2D projection image data representing a 2D projection of the first 3D data at least in part by rotating the first 3D data;
determine an adversarial loss representing a difference between the second 2D projection image data and the distribution of 2D data; and
generate an updated second machine learning network.

16. The system of claim 12, the at least one non-transitory computer-readable memory storing further instructions that, when executed by the at least one processor, are further effective to program the at least one processor to:
receive, by the first machine learning network at a time t, a first segment of video data comprising second input 2D data and third input 2D data, the second input 2D data being a first frame of the video data and the third input 2D data being a second frame of the video data;
generate, by the first machine learning network, third 3D data representing the second input 2D data;
generate, by the first machine learning network, fourth 3D data representing the third input 2D data;
receive, by the first machine learning network at a time t+1, a second segment of the video data comprising the third input 2D data and fourth input 2D data, the fourth input 2D data being a third frame of the video data;
generate, by the first machine learning network, fifth 3D data representing the third input 2D data;
generate, by the first machine learning network, sixth 3D data representing the fourth input 2D data;
determine a difference between the fifth 3D data and the fourth 3D data; and
update the first machine learning network based at least in part on the difference.

17. The system of claim 12, the at least one non-transitory computer-readable memory storing further instructions that, when executed by the at least one processor, are further effective to program the at least one processor to:
input the first 2D projection image data into the first machine learning network;
generate, by the first machine learning network, third 3D data representing the first 2D projection image data;
determine a difference between the first 3D data and the third 3D data; and
update the first machine learning network based at least in part on the difference.

18. The system of claim 12, the at least one non-transitory computer-readable memory storing further instructions that, when executed by the at least one processor, are further effective to program the at least one processor to:
generate, by the first machine learning network, third 3D data representing the input 2D data;
determine a first length between a first joint and a second joint as represented in the first 3D data;
determine a second length between the first joint and the second joint as represented in the third 3D data;
determine a difference between the first length and the second length; and
update the first machine learning model based at least in part on the difference.

* * * * *